(12) United States Patent
Stopper et al.

(10) Patent No.: US 10,689,863 B2
(45) Date of Patent: Jun. 23, 2020

(54) FIBROUS LAMINATE FLOOR UNDERLAYMENT WITH IMPROVED ACOUSTICAL INSULATION AND BREATHABLE BARRIER PROTECTION

(71) Applicant: Kimberly-Clark Worldwide, Inc., Neenah, WI (US)

(72) Inventors: Steven R. Stopper, Suwanee, GA (US); John D. Tucker, Woodstock, GA (US)

(73) Assignee: KIMBERLY-CLARK WORLDWIDE, INC., Neenah, WI (US)

( * ) Notice: Subject to any disclaimer, the term of this patent is extended or adjusted under 35 U.S.C. 154(b) by 165 days.

(21) Appl. No.: 15/749,407

(22) PCT Filed: Jul. 31, 2015

(86) PCT No.: PCT/US2015/043091
§ 371 (c)(1),
(2) Date: Jan. 31, 2018

(87) PCT Pub. No.: WO2017/023242
PCT Pub. Date: Feb. 9, 2017

(65) Prior Publication Data
US 2018/0223545 A1    Aug. 9, 2018

(51) Int. Cl.
*B32B 3/00* (2006.01)
*E04F 15/20* (2006.01)
(Continued)

(52) U.S. Cl.
CPC ............. *E04F 15/203* (2013.01); *B32B 3/30* (2013.01); *B32B 5/022* (2013.01); *E04F 15/185* (2013.01);
(Continued)

(58) Field of Classification Search
CPC .............. B32B 5/022; B32B 2307/102; B32B 2471/00; B32B 2419/04; B32B 3/30; E04F 15/203
See application file for complete search history.

(56) References Cited

U.S. PATENT DOCUMENTS

| | | |
|---|---|---|
| 5,858,515 A | 1/1999 | Stokes et al. |
| 6,629,340 B1 | 10/2003 | Dale et al. |

(Continued)

FOREIGN PATENT DOCUMENTS

| | | |
|---|---|---|
| DE | 102011000959 B3 | 7/2012 |
| EP | 0667749 B1 | 2/1998 |

(Continued)

OTHER PUBLICATIONS

Kimberly-Clark Block-It House Wrap, ICC-ES Evaluation Report ESR-3641, May 2015, and FBC Supplement, Jul. 2015, 4 pages.

(Continued)

*Primary Examiner* — Elizabeth E Mulvaney
(74) *Attorney, Agent, or Firm* — Craig M. Bohlken (57) ABSTRACT

The present invention relates to a floor underlayment that may be positioned directly in contact with the underside surface of a finished floor and comprise more than one layer such as a first layer pattern-unbonded nonwoven web and a second layer microporous film. Additional layers may comprise a meltblown nonwoven layer and a spunbond layer. The floor underlayment of the present invention may exhibit a sound pressure level (SPL in dB at 800 Hz or 1600 Hz) reduction IIC of about 30 to about 40.

22 Claims, 4 Drawing Sheets

(51) Int. Cl.
*E04F 15/18* (2006.01)
*B32B 3/30* (2006.01)
*B32B 5/02* (2006.01)

(52) U.S. Cl.
CPC ............ *E04F 15/186* (2013.01); *E04F 15/20* (2013.01); *B32B 2305/026* (2013.01); *B32B 2307/102* (2013.01); *B32B 2307/724* (2013.01); *B32B 2419/00* (2013.01)

(56) References Cited

U.S. PATENT DOCUMENTS

| | | |
|---|---|---|
| 6,893,711 B2 | 5/2005 | Williamson et al. |
| 8,056,292 B2 | 11/2011 | Swanson et al. |
| 8,536,077 B2 | 9/2013 | Dai et al. |
| 2003/0172600 A1 | 9/2003 | Choi |
| 2004/0077247 A1 | 4/2004 | Schmidt et al. |
| 2004/0131836 A1 | 7/2004 | Thompson |
| 2005/0026527 A1 | 2/2005 | Schmidt et al. |
| 2006/0230699 A1 | 10/2006 | Keene |
| 2010/0077684 A1 | 4/2010 | Socha |
| 2011/0073239 A1 | 3/2011 | Manning et al. |
| 2014/0097037 A1* | 4/2014 | Wingfield ................. E04B 1/84 181/290 |
| 2015/0175792 A1* | 6/2015 | Chou ................... C08L 23/0869 442/76 |

FOREIGN PATENT DOCUMENTS

| | | |
|---|---|---|
| EP | 2065534 A1 | 6/2009 |
| GB | 2478962 A | 9/2011 |
| JP | 2002-069824 A | 3/2002 |
| JP | 2005-273274 A | 10/2005 |
| WO | WO 2008/005728 A1 | 1/2008 |
| WO | WO 2012/030770 A1 | 3/2012 |
| WO | WO 2015/027282 A1 | 3/2015 |
| WO | WO 2017/023242 A1 | 2/2017 |

OTHER PUBLICATIONS

Kimberly-Clark Block-It House Wrap, recommendations, installation instructions, Tech Data Sheet, and Safety Data Sheet Nov. 18, 2015, 19 pages.

* cited by examiner

FIG. 6

FIBROUS LAMINATE FLOOR UNDERLAYMENT WITH IMPROVED ACOUSTICAL INSULATION AND BREATHABLE BARRIER PROTECTION

FIELD OF THE INVENTION

The present invention relates to materials as an improved floor underlayment that provides an acoustical barrier as well as a breathable moisture barrier to walking surfaces.

BACKGROUND OF THE INVENTION

Floor underlayments are used on top of subfloors such as concrete, plywood or oriented strand board prior to a finished flooring surface being placed on top of them. Such finished flooring can be typically ¾″ solid wood, engineered wood laminates, laminates or linoleum vinyl tiles. These floor underlayments typically provide a moisture barrier and may even provide a cushion along with minimizing sounds. Common materials used are recycled fibers, foam, foam beads, film or film laminates.

A new generation has prompted the popularity of condos, apartments, townhomes and multifamily homes wherein noise abatement and sound deadening have become increasingly significant. Particularly, minimizing the impact of sounds from the floors above has become a pivotal focus. Conventional floor underlayment materials have been used to reduce sound transmission including foams, plastic sheeting, compressed fibers, rubber, felts, cork, and the like. Specifically, high denier recycled fibers or foams are common floor underlayment components. Typically found between the subfloor and the finished flooring, builders often use floor underlayment to help provide a cushion or a more even walkway to the overall finished flooring. Although they may also function to dampen the noise from walking, even the current and best floor underlayments are not impactful enough in the amount of noise-level they are able to reduce.

Sound transmission, particularly in construction, is measured according to the American Society for Testing and Materials (ASTM). Noise measurements are measured in standard decibel ratings (dB-A-weighted) and are used for compliance with local, state, and/or federal requirements. There are two classes for sound ratings: Sound Transmission Class (STC) and Impact Isolation Class (IIC). STC is used to evaluate the reflected sound noise within a room (speech, music, TV, etc. . . . ) particularly through the wall structure of an apartment, house, commercial spaces, townhomes or condominiums. IIC is used to evaluate sound transmission noise of a floor/ceiling structure (walking, floor, impact, etc. . . . ) within commercial spaces, townhomes, condos, houses or apartments. Although not required, virtually all states and municipalities have set guidelines for the minimum IIC test rating that a building may have, and it's not uncommon to find minimum IIC and related STC ratings inserted into requests for proposals from architects and other designers. The International Code Council states the minimum acceptable level of performance for both STC and IIC is 50-IIC. The "preferred" level of performance for STC and IIC is 60.

Of particular interest to IIC ratings, one common misconception is that using an increased thickness of an underlayment will result in a better IIC rating. While this is generally true, this is not economically viable. The initial doubling of a material may increase performance but may still fail to meet an acceptable IIC rating and/or create commercial value. Thus, the addition of layers can cause a diminishing return. For example, suppose a 2 mm underlayment improves an assembly's IIC rating by 12 points. Doubling it to 4 mm may give another 3-5 points of improvement. Increasing the thickness beyond that point may add another 1-2 points for a few more millimeters; however, the amount of improvement begins to plateau with the increased thickness. Creating thick underlayments based solely on layering, therefore, is not a reasonable solution for resolving noise issues.

Many current floor underlayments include additional backing adhered to the underlayment to provide protection against spills, such as liquids. While offering a protective solution to the floors, such a system creates an unbreathable barrier. Moreover, moisture can get trapped within the flooring system leading to mold, mildew and other disadvantages.

Several floor underlayment systems can be found in the industry to tackle the foregoing problems including, but not limited to, a poured underlayment system such as LEVELROCK® floor underlayment sold by United States Gypsum Company of Chicago, Ill. (USG). LEVELROCK® underlayment is a mixture of Plaster of Paris, Portland cement and crystalline silica. Another system includes US 2010/0077684 to Socha, filed Sep. 22, 2009, which, provides an underlayment acoustical mat that is placed upon a subfloor with a poured underlayment (such as LEVELROCK®) being combined at the jobsite for application on to the mat. The finished flooring is then installed over the set underlayment and mat. Although such a system may address noise concerns, it must be installed during construction which may eliminate its use in pre-existing buildings or homes and may be entirely cost prohibitive for most residential home constructions or residential renovations.

Thus, it is desirable to provide a floor underlayment that can be installed between a subfloor and finished flooring without the need for a poured underlayment cement system. Additionally, it is desirable that such a floor underlayment not only significantly reduces sound impact, but is breathable and provides for a barrier against liquids.

SUMMARY OF THE INVENTION

The present invention relates to a floor underlayment comprising at least two layers, said first layer comprising a pattern-unbonded nonwoven web, said pattern-unbonded nonwoven web having a first surface opposite a second surface, said first surface being flat and said second surface comprising a 3D surface, said 3D surface having thereof a pattern of from about 15 percent to about 60 percent of continuous bonded areas defining a plurality of discrete unbonded areas; and a second layer comprising a microporous film having a first surface opposite a second surface, said first surface of said film adhered to said first flat surface of said pattern-unbonded nonwoven web; wherein said floor underlayment is positioned directly in contact with the underside surface of a finished floor; and wherein the sound pressure level (SPL in dB at 800 Hz or 1600 Hz) reduction IIC of said finished floor and said floor underlayment conjointly exhibit a value of about 30 to about 40. In such an embodiment, the floor underlayment and the finished floor conjointly exhibit a noise reduction of from about 50 dB to about 65 db in Delta IIC testing.

Another embodiment of the present invention is a floor underlayment comprising multiple layers, said first layer comprising a pattern-unbonded nonwoven web, said pattern-unbonded nonwoven web having a first surface opposite a second surface, said first surface being flat and said second surface comprising a 3D surface, said 3D surface having thereof a pattern of from about 15 percent to about 60 percent of continuous bonded areas defining a plurality of discrete unbonded areas; a second layer comprising a microporous film having a first surface opposite a second surface, said first surface of said film adhered to said first flat surface of said pattern-unbonded nonwoven web; and a third layer comprising a meltblown nonwoven layer having a first surface and an opposing second surface; wherein said floor underlayment is positioned directly in contact with the underside surface of a finished floor; and wherein the sound pressure level (SPL in dB at 800 Hz or 1600 Hz) reduction IIC of said finished floor and said floor underlayment conjointly exhibit a value of about 30 to about 40. In such an embodiment, the floor underlayment and the finished floor conjointly exhibit a noise reduction of from about 50 dB to about 85 db in Delta IIC testing.

In an alternative embodiment, the present invention is a floor underlayment comprising multiple layers, said first layer comprising a pattern-unbonded nonwoven web, said pattern-unbonded nonwoven web having a first surface opposite a second surface, said first surface being flat and said second surface comprising a 3D surface, said 3D surface having thereof a pattern of from about 15 percent to about 60 percent of continuous bonded areas defining a plurality of discrete unbonded areas; a second layer comprising a microporous film having a first surface opposite a second surface, said first surface of said film adhered to said first flat surface of said pattern-unbonded nonwoven web; a third layer comprising a meltblown nonwoven layer having a first surface and an opposing second surface; and a fourth layer comprising a spunbond layer having a first surface and an opposing second surface; wherein said floor underlayment is positioned directly in contact with the underside surface of a finished floor; and wherein the sound pressure level (SPL in dB at 800 Hz or 1600 Hz) reduction IIC of said finished floor and said floor underlayment conjointly exhibit a value of about 30 to about 40. In such an embodiment, the floor underlayment and the finished floor conjointly exhibit a noise reduction of from about 50 dB to about 85 db in Delta IIC testing.

In a multiple layer floor underlayment, the layers may be positioned such that the first surface of said spunbond layer is positioned to be available for direct contact with a first external surface, said first external surface may be selected from a finished floor and a subfloor, and said second opposing surface of said spunbond layer is adjacent to and in contact with said first surface of said meltblown layer, said second opposing surface of said meltblown layer is in adjacent to and in contact with said first surface of said film layer, said second opposing surface of said film layer is adhered to said first flat surface of said PUB spunbond layer, and said second opposing surface of said PUB spunbond layer is positioned to be available for direct contact with a second external surface, said second external surface may be selected from a finished floor and a subfloor.

BRIEF DESCRIPTION OF THE DRAWINGS

A full and enabling disclosure of the present invention is set forth more particularly in the remainder of the specification, including reference to the accompanying figures, in which.

DETAILED DESCRIPTION OF THE INVENTION

While the specification concludes with the claims particularly pointing out and distinctly claiming the invention, it is believed that the present invention will be better understood from the following description.

All percentages, parts and ratios are based upon the total weight of the compositions of the present invention, unless otherwise specified. All such weights as they pertain to listed ingredients are based on the active level and, therefore; do not include solvents or by-products that may be included in commercially available materials, unless otherwise specified. The term "weight percent" may be denoted as "wt. %" herein. Except where specific examples of actual measured values are presented, numerical values referred to herein should be considered to be qualified by the word "about".

As used herein, "comprising" means that other steps and other ingredients which do not affect the end result can be added. This term encompasses the terms "consisting of" and "consisting essentially of". The compositions and methods/processes of the present invention can comprise, consist of, and consist essentially of the essential elements and limitations of the invention described herein, as well as any of the additional or optional ingredients, components, steps, or limitations described herein.

The use of any trademarks herein has been noted with CAPITALIZATION of the word wherever it appears to acknowledge and respect the proprietary nature held by the owners of the mark. The word is followed by the generic terminology only wherever it appears for the first time herein.

As used herein, "denier" refers to a commonly used expression of fiber thickness which is defined as grams per 9000 meters. A lower denier indicates a finer fiber and a higher denier indicates a thicker or heavier fiber. Denier can be converted to the international measurement "dtex", which is defined as grams per 10,000 meters, by dividing denier by 0.9.

As used herein, the term "external surface" refers to a surface that is either a finished floor or a subfloor. Specifically, the external surface of a finished floor is directed to the underside surface of the finished floor and the external surface of a subfloor is directed to the top surface of the subfloor.

As used herein, the term "finished floor" or "finished flooring" refers to any type of wood floor, laminate floor, linoleum floor, vinyl floor, ceramic floor, marble floor, carpet floor and the like.

As used herein, the term "laminate" means a composite material made from two or more layers or webs of material which have been attached or bonded to one another.

As used herein, the term "nonwoven web" means a web having a structure of individual fibers or threads which are interlaid, but not in an identifiable manner as in a knitted web. Nonwoven webs have been formed from many processes, such as, for example, meltblowing processes, spunbonding processes, air-laying processes, conforming processes and bonded carded web processes. The basis weight of nonwoven webs is usually expressed in ounces of material per square yard (osy) or grams per square meter (gsm) and the fiber diameters useful are usually expressed in microns, or in the case of staple fibers, denier. It is noted that to convert from osy to gsm, multiply osy by 33.91.

As used herein, "meltblown fibers" means fibers formed by extruding a molten thermoplastic material through a plurality of fine, usually circular, die capillaries as molten threads or fibers into converging high velocity, usually hot, gas (e.g. air) streams which attenuate the fibers of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin. Meltblown fibers are microfibers, which may be continuous or discontinuous, and are generally smaller than 10 microns in average diameter. The term "meltblown" is also intended to cover other processes in which a high velocity gas, (usually air) is used to aid in the formation of the fibers, such as melt spraying or centrifugal spinning.

As used herein, the term "polymer" generally includes, but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the molecule. These configurations include, but are not limited to isotactic, syndiotactic and random symmetried.

As used herein, the term "pattern bonded" refers to a process of bonding a nonwoven web in a pattern by the application of heat and pressure or other methods, such as ultrasonic bonding. Thermal pattern bonding typically is carried out at a temperature in a range of from about 80° C. to about 180° C. and a pressure in a range of from about 150 to about 1,000 pounds per linear inch (59-178 kg/cm). The pattern employed typically will have from about 10 to about 250 bonds/in² (1-40 bonds/cm²) covering from about 5 to about 30 percent of the surface area. Such pattern bonding is accomplished in accordance with known procedures. See, for example, U.S. Design Pat. No. 239,566 to Vogt, U.S. Design Pat. No. 264,512 to Rogers, U.S. Pat. No. 3,855,046 to Hansen et al, and U.S. Pat. No. 4,493,868, supra, for illustrations of bonding patterns and a discussion of bonding procedures. Ultrasonic bonding is performed, for example, by passing the multilayer nonwoven web laminate between a sonic horn and anvil roll as illustrated in U.S. Pat. No. 4,374,888 to Bornslaeger.

As used herein, the term "pattern-unbonded" or "PUB" refers to a process wherein the fibers or filaments of a nonwoven fabric or web are substantially or completely free of bonding or fusing and retain their fibrous structure. See, for example, U.S. Pat. No. 5,858,515 to Stokes et al.

The present invention provides for a nonwoven material that provides superior capabilities of minimizing or blocking noise transmission that is typically created by walking on a surface of a finished floor. Most importantly, the present invention provides a floor underlayment that not only dampens noise but, it also provides water vapor permeability, tear-resistance, a liquid barrier, and is easy to install.

The floor underlayment of the present invention comprises at least two layers or multiple layers wherein a layer may comprise a nonwoven fabric or web such as spunbond, meltblown, or a combination of both, having continuous bonded areas defining a plurality of discrete, pattern-unbonded areas ("PUB") that is adhesively laminated to a breathable microporous film. The continuous bonded areas of the pattern-unbonded nonwoven web are substantially fluid impermeable, while the discrete unbonded areas of the web remain fluid permeable. The pattern-unbonded web comprises a pattern of from about 15 percent, from about 20 percent, or from about 25 percent to about 50 percent, to about 55 percent or from about 60 percent of continuous bonded areas defining a plurality of discrete unbonded areas such that the web can be utilized to direct and channel fluid flow. Moreover, the three-dimensional surface of the pattern-unbonded material can be placed atop a subfloor either face-down (PUB in contact with and atop subfloor) or face-up (film in contact with and atop subfloor) to provide the necessary air circulation, improve moisture evaporation, provide breathability and to reduce the possibility of mold growth in a flooring system. The variety of benefits offered by the present invention in a single floor underlayment has been unmet until now. Specifically, the present invention provides a floor underlayment wherein the sound pressure level (SPL in dB at 800 Hz or 1600 Hz) reduction IIC exhibits a value of about 30, of about 32, of about 33, of about 35, of about 37, of about 39, or of about 40. The floor underlayment may be two layered or multiple layered. When the floor underlayment has multiple layers, the first layer may comprise a pattern-unbonded nonwoven fabric, said pattern-unbonded nonwoven fabric having a surface thereof a pattern of from about 15 percent to about 60 percent of continuous bonded areas defining a plurality of discrete unbonded areas; and the second layer may comprise a microporous film layer atop said bottom pattern-unbonded nonwoven fabric layer. Additional layers such as meltblown may be preferred. Moreso, an additional layer of spunbond may be also be used along with the meltblown additional layer. The floor underlayment may be installed wherein it is sandwiched between and directly in contact with the underside of a finished floor and directly in contact atop a subfloor. The floor underlayment and finished floor conjointly may exhibit a noise reduction of from about 50 to about 65 dB in Delta IIC testing or from about 50 to about 85 dB in Delta IIC testing. The Delta IIC test (ASTM E-2179) is a variation of the IIC which can be used to isolate the contribution of the finished floor and underlayment to the total sound reduction. It can be performed with a standard concrete subfloor and comparing the results of two different IIC tests; one with just the concrete slab and the other with the floor covering material and underlayment included. By subtracting the "slab only" IIC test from the IIC test that includes the finished floor and underlayment, the result is an IIC number representing the change in (or Delta) IIC. In order to compare the impact sound isolation ability of underlayments, the Delta IIC test allows for much more control over the many test variables and is thus the standard used to arrive at the present invention.

Figure 1A:
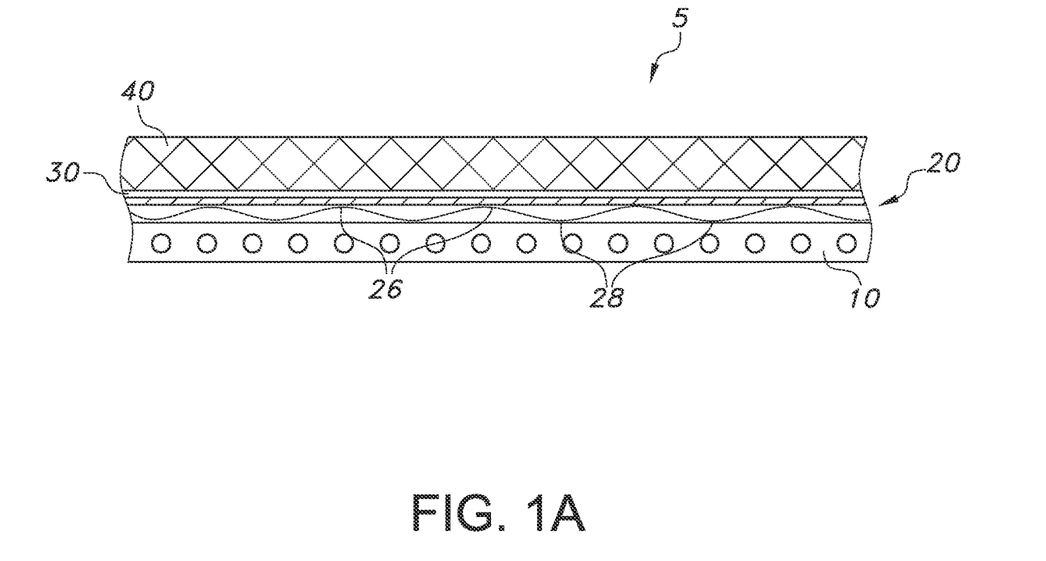
FIG. 1A is a cross-sectional view of a general flooring system of the present invention.
Figure 1B:
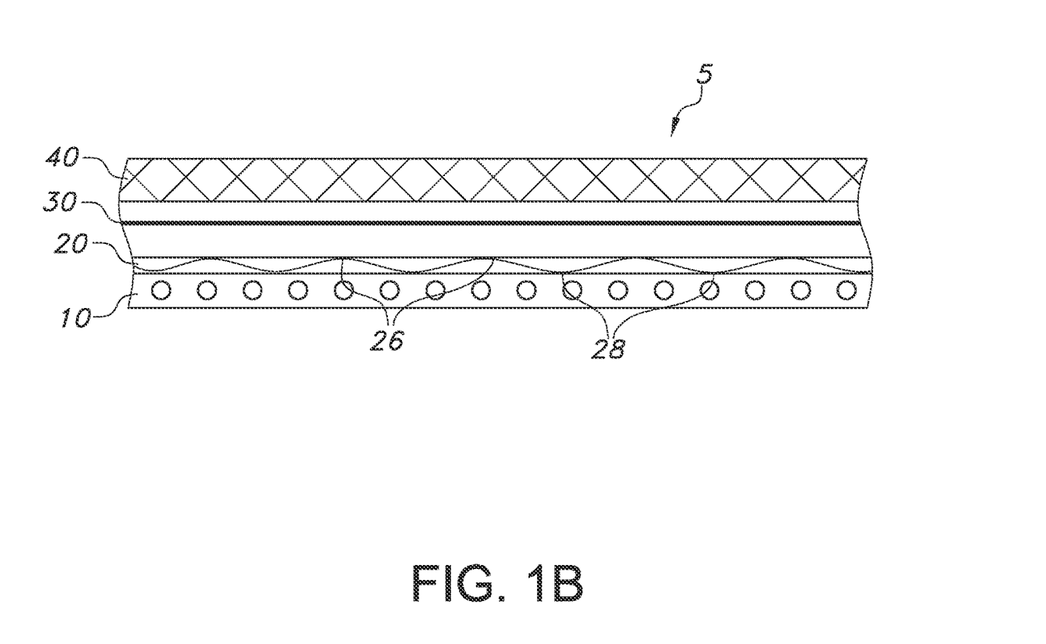
FIG. 1B is an explosive view of the general flooring system of the present invention.

Referring to FIGS. 1A and 1B, a general flooring system 5 is shown wherein the system layers of the present invention are shown schematically, and not necessarily to scale, to demonstrate how one embodiment may be installed. In particular, the present invention may be positioned directly between the underside surface of a finished floor 40 and atop a subfloor 10. Specifically, the layer comprising a PUB spunbond material 20 (shown face-down) may be in direct contact with the subfloor 10 such that the 3D surface created by the unbonded 28 material is in direct contact with the subfloor 10. When the PUB spunbond material 20 is face-down, one side of a film 30 may be adhered to the flat surface of the PUB spunbond material while the other side of the film is positioned directly below and in contact with the underside of a finished floor 40. Of course, the PUB spunbond material 20 could also be face-up such that the 3D surface created by the unbonded 28 material may be in direct contact with the finished floor 40 allowing for one side of the film 30 to be adhered to the flat surface of the PUB spunbond material 20 while the other side of the film 30 is directly atop and in contact with the subfloor 10. Additional layers such as meltblown, or spunbond, or meltblown and spunbond may also be used with the foregoing. The present invention can be installed after construction has been completed and may even be part of the maintenance of a building or home wherein a new finished floor is installed. The total basis weight of the floor underlayment of the present invention should be from about 80 gsm, from about 85 gsm, from about 90 gsm, from about 100 gsm, from about 115 gsm, from about 200 gsm, from about 290 gsm, to about 372 gsm, to about 378 gsm, to about 400 gsm, to about 450 gsm, to about 460 gsm, to about 550 gsm, to about 600 gsm, to about 630 gsm, to about 700 gsm, or to about 850 gsm.

Surprisingly, it has been discovered that the present invention can not only significantly provide noise dampening to a floor or room, it also provides for a breathable barrier and air flow which results in a superior performing floor underlayment system that offers water vapor permeability and a liquid barrier.

An alternative embodiment of the present invention provides additional layers, specifically a meltblown layer or a meltblown layer and spunbond layer that not only enhances the structural integrity of the floor underlayment, but also provides enhanced, advantageous noise dampening results.

Spunbond and PUB Spunbond Material

Spunbond nonwoven webs are made from melt-spun filaments. As used herein, the term "melt-spun filaments" refers to small diameter fibers and/or filaments which are formed by extruding a molten thermoplastic material as filaments from a plurality of fine, usually circular, capillaries of a spinnerette with the diameter of the extruded filaments then being rapidly reduced, for example, by non-eductive or eductive fluid-drawing or other well-known spunbonding mechanisms. The production of spunbond nonwoven webs is described in U.S. Pat. No. 4,340,563 to Appel et al., U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartmann, U.S. Pat. No. 3,276,944 to Levy, U.S. Pat. No. 3,502,538 to Peterson, and U.S. Pat. No. 3,542,615 to Dobo et al. The melt-spun filaments formed by the spunbond process are generally continuous and have diameters larger than 7 microns, more particularly, between about 10 and 30 microns. The spunbond filaments usually are deposited onto a moving foraminous belt or forming wire where they form a web. Spunbond filaments generally are not tacky when they are deposited onto the collecting surface.

Spunbond materials typically are stabilized or consolidated (pre-bonded) in some manner immediately as they are produced in order to give the web sufficient integrity to withstand the rigors of further processing into a finished product. This stabilization (pre-bonding) step may be accomplished through the use of an adhesive applied to the filaments as a liquid or powder which may be heat activated, or more commonly, by compaction rolls. As used herein, the term "compaction rolls" means a set of rollers above and below the web used to compact the web as a way of treating a just produced, melt-spun filament, particularly spunbond web, in order to give the web sufficient integrity for further processing, but not the relatively strong bonding of secondary bonding processes, such as through-air bonding, thermal bonding, ultrasonic bonding and the like. Compaction rolls slightly squeeze the web in order to increase its self-adherence and thereby its integrity. An alternative means for performing the pre-bonding step employs a hot air knife, as described in detail in U.S. Pat. No. 5,707,468 to Arnold et al. All such nonwoven webs may be pre-bonded, using known nonwoven web bonding techniques, and subsequently bonded using the PUB method and apparatus as described in U.S. Pat. No. 5,858,515 to Stokes, et al. It is preferred that the basis weight of the spunbond web is from about 30 gsm, from about 32 gsm, from about 50 gsm, from about 110 gsm or from about 250 gsm to about 50 gsm, to about 150 gsm, to about 300 gsm, to about 400 gsm.

Figure 3:
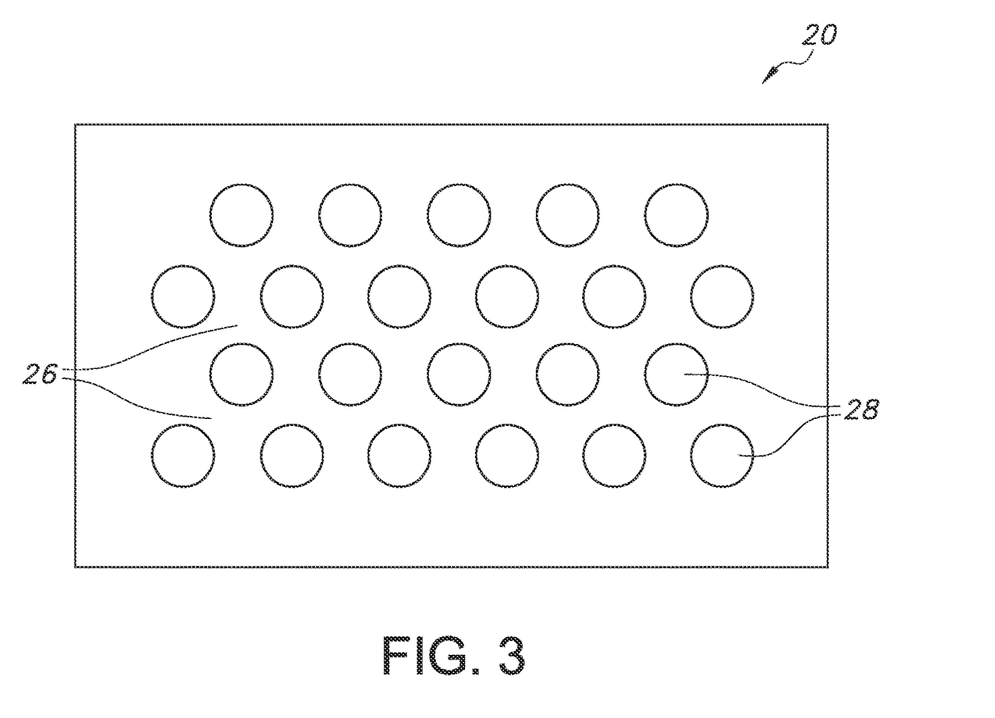
FIG. 3 is a top elevational view of the pattern-unbonded nonwoven layer of a general flooring system of the present invention.
Figure 4:
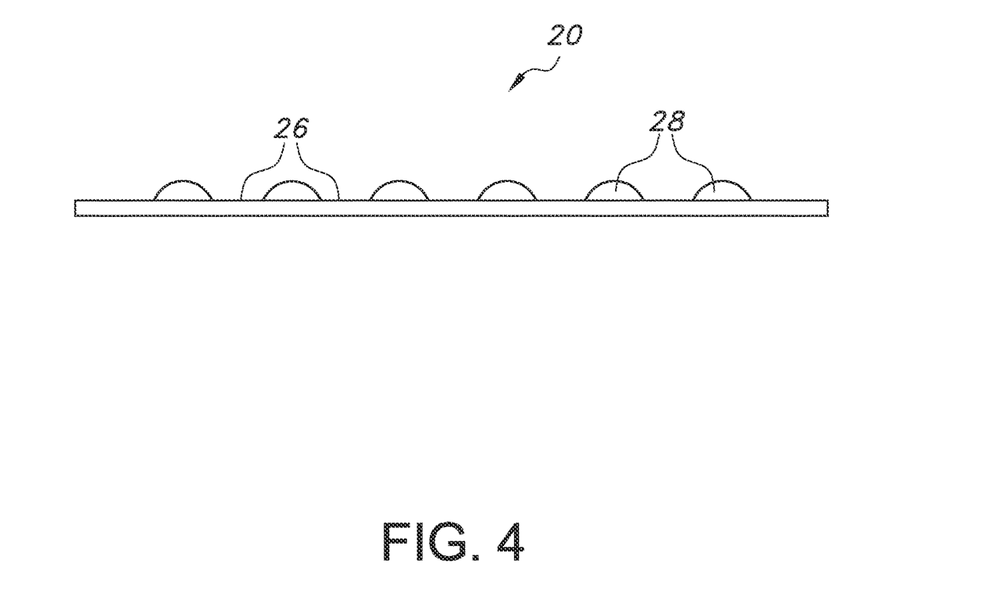
FIG. 4 is a cross-sectional view of the pattern-unbonded nonwoven layer of FIG. 3.

Referring to FIGS. 3 and 4 (wherein the PUB spunbond is shown face-up), the PUB spunbond material 20 can be generally described as any nonwoven fabric or web having a pattern of continuous bonded areas 26 defining a plurality of discrete unbonded areas 28 that are formed on at least one surface thereof. The 3D surface of the PUB spunbond material 20 is created by the unbonded 28 material protruding from the flat surface of the web in a Y-axis direction while the bonded 26 areas remain connected to the web. The fibers or filaments of the web material may be formed from thermoplastic polymeric materials. As used herein, the terms "thermoplastic polymer" or "thermoplastic polymeric material" refer to a long-chain polymer that softens when exposed to heat and returns to its original state when cooled to ambient temperature. Exemplary thermoplastic materials include, without limitation, poly(vinyl chloride)s, polyesters, polyamides, polyfluorocarbons, polyolefins, polyurethanes, polystyrenes, poly(vinyl alcohol)s, caprolactams, and copolymers of the foregoing. The fibers or filaments used in making PUB nonwoven material 20 may have any suitable morphology and may include hollow or solid, straight or crimped, single component, bicomponent or multicomponent, biconstituent or multiconstituent fibers or filaments, and blends or mixes of such fibers and/or filaments, as are well known in the art.

Figure 5:
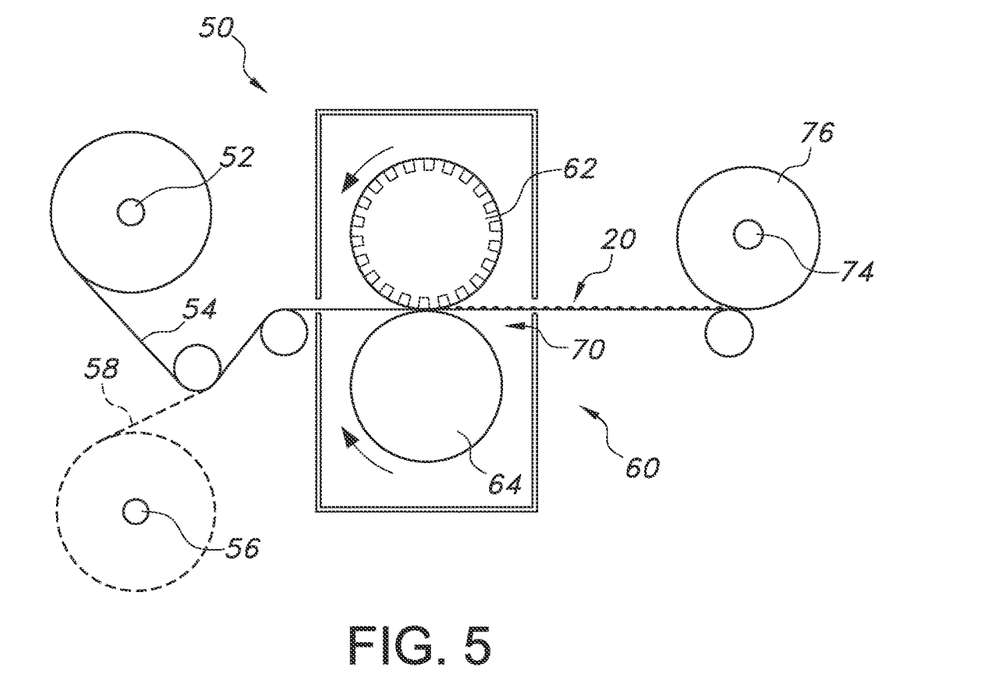
FIG. 5 is a schematic side view of a process and apparatus for making the pattern-unbonded nonwoven material included in a general flooring system of the present invention.
Figure 6:
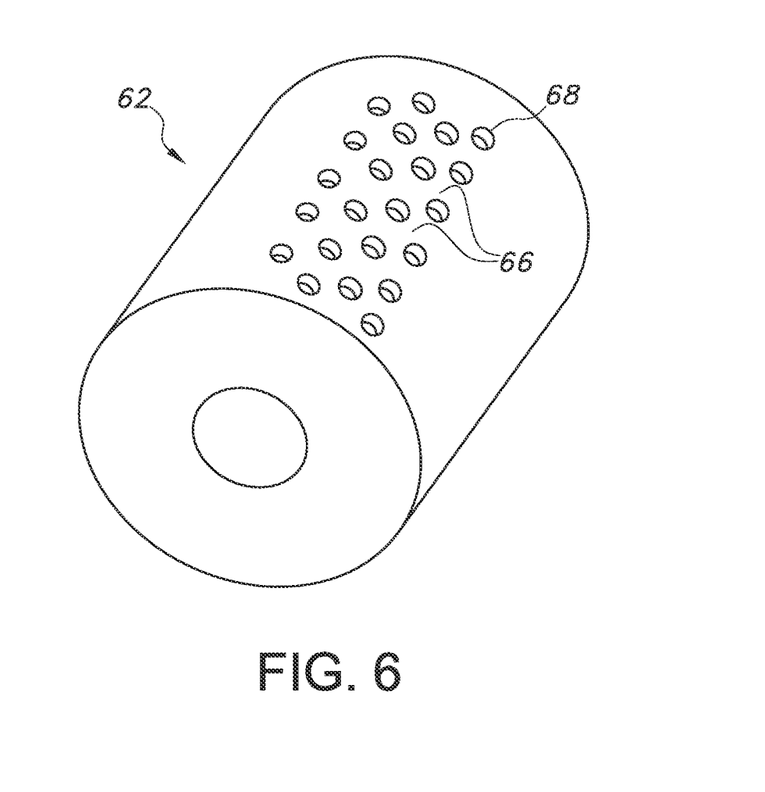
FIG. 6 is a partial perspective view of a pattern roll that can be used in accordance with the process and apparatus of FIG. 5.

After the nonwoven web is formed, the pre-bonded or unbonded web is passed through a suitable process and apparatus to form the PUB nonwoven 3D surface of the present invention. Referring now to FIGS. 5 and 6, a process and apparatus for forming the PUB 3D surface of the invention is represented generally as element 50. The apparatus includes a first web unwind 52 for a first web 54. Optionally, one or more additional web unwinds 56 (shown in phantom) for additional webs or layers 58 may be employed in forming multi-layer PUB laminates. It should be understood that although the apparatus shown in FIG. 4 illustrates a web unwind 52, the PUB assembly 60 may be placed in a continuous (in-line) process with a nonwoven forming equipment (not shown). As used herein, the term "PUB assembly" should not be construed as an apparatus for disassembling, destroying or removing existing bonds, if any, in a web 54; rather, PUB assembly refers to an apparatus that continuously bonds or fuses the fibers or filaments forming a web 54 in specified areas of the web, and prevents bonding or fusing of the fibers or filaments of the web 54 in other specified areas of the web, such areas being referred to herein as bonded areas 26 and unbonded areas 28, respectively.

The first web 54 (or simply "web" if only one unwind is used) is taken off the unwind 52 and passed into a PUB assembly 60 that includes a first or pattern roll 62 and a second or an anvil roll 64, both of which are driven by conventional drive means, such as, for example, electric motors (not shown). Pattern roll 62 is a right circular cylinder that may be formed of any suitable, durable material, such as, for example, steel, to reduce wear on the rolls during use. Pattern roll 62 has on its outermost surface a pattern of land areas 66 that define a plurality of discrete openings or apertures 68. The land areas 66 are designed to form a nip 70 with the smooth or flat outer surface of oppositely positioned anvil roll 64, which also is a right circular cylinder that can be formed of any suitable, durable material.

The size, shape, number and configuration of openings 68 in a pattern roll 62 can be varied to meet the particular end-use needs of the PUB 3D surface material 20. In order to reduce the incidence of fiber pull-out in the resulting PUB 3D surface material 20, the sized of openings 68 in a pattern roll 62 should be dimensioned to reduce the likelihood that the entire length of the filaments or fibers forming an unbonded 28 area will lie within a single unbonded area 28. Stated differently, fiber length should be selected to reduce the likelihood that the entire length of a given fiber or filament will fall within a single unbonded area 28.

As shown in FIG. 5, circular openings 68 may have an average diameter ranging from about 0.050 in (about 0.127 cm) to about 0.250 inch (about 0.635 cm), and more specifically, from about 0.130 inch (0.330 cm) to about 0.160 inch (0.406 cm), and a depth measured from the outermost surface of pattern roll 62 of at least about 0.020 inch (about 0.051 cm), and more particularly at least about 0.060 inch (0.152 cm), are considered suitable for forming the PUB material 20 of the present invention.

The number or density of openings 68 in pattern roll 62 also can be selected to be in the range of from about 1.0 opening per square centimeter ($cm^2$) to about 25.0 openings/ $cm^2$, and more particularly from about 5.0 to about 7.0 openings/$cm^2$ in forming the PUB 3D surface of the present invention. Moreover, the spacing between individual openings 68 can be selected to enhance the air flow channels. Suitable inter-opening spacings can range from about 0.13 inch (about 3.30 mm) to about 0.22 inch (about 5.59 mm), centerline-to-centerline, in the machine and cross-machine directions. As used herein, the term "machine direction" or MD means the length of a material or fabric in the direction in which it is produced. The term "cross-machine direction" or CD means the width of a material or fabric, i.e., a direction generally perpendicular to the MD. The particular arrangement or configuration of openings 68 in a pattern roll 62 is not considered critical, however, so long as in combination with the opening size, shape and density, the desired levels of surface integrity and durability are achieved. For example, as shown in FIG. 3, the individual openings 68 are arranged in staggered rows (see also FIG. 6). Other different configurations are considered within the scope of the present invention.

Microporous Film

The floor underlayment of the present invention comprises a microporous film layer or film layer 30 that is layered over the flat surface of the PUB spunbond material 20 to essentially create a PUB spunbond film laminate or "PUB SFL". By "flat surface of the PUB spunbond material", it is meant, the surface opposite the 3D surface of the PUB spunbond material 20 where there is an absence of protrusions created by the unbonded 28 areas of the web. One side of the film layer 30 can be applied to the flat side of the PUB spunbond material 20 by a variety of means such as adhesive application, ultrasonic bonding or thermal bonding. The film 30 includes at least two basic components: a polyolefin polymer, advantageously a predominantly linear polyolefin polymer, such as linear low density polyethylene (LLDPE) or polypropylene, and a filler. These components are mixed together, heated and then extruded into a film layer using any one of a variety of film-producing processes known to those of ordinary skill in the film processing art. Such film-making processes include, for example, cast embossed, chill and flat cast, and blown film processes. Other additives and ingredients may be added to the film layer 30 for additional benefits provided they do not significantly interfere with the ability of the film layer to function in accordance with the teachings of the present invention. Generally, on a dry weight basis, based on the total weight of the film, the film 30 will include from about 30 to about 70 weight percent of the polyolefin polymer, and from about 30 to about 70 weight percent of the filler. In more specific embodiments, it may include, additionally from about 0.5 percent to about 20 percent by weight of another polyolefin polymer, such as a low density polyethylene.

LLDPE has been found to work well as a film base when blended with appropriate amounts of a filler. It is believed, however, that any suitable polyolefin polymer can be used in forming the film layer 30 of the present invention, and advantageously any predominately linear polyolefin polymer can be used in forming the film layer 30 of the present invention. As used herein, the term "linear low density polyethylene" is meant to include polymers of ethylene and higher alpha olefin comonomers such as $C_3$-$C_{12}$ and combinations thereof and has a Melt Index (MI) as measured by ASTM D-1238 Method D of from about 0.5 to about 10 (grams per 10 minutes at 190° C.). By "predominantly linear" it is meant that the main polymer chain is linear with less than approximately 5 long chain branches per 1000 ethylene units. Long chain branches would include carbon chains greater than $C_{12}$. For predominately linear polyolefin polymers that are nonelastic, short chain branching ($C_3$-$C_{12}$) due to comonomer inclusion will typically be limited to less than 20 short chains per 1000 ethylene units and 20 or greater for polymers which are elastomeric. Examples of predominately linear polyolefin polymers include, without limitation, polymers produced from the following monomers: ethylene, propylene, 1-butene, 4-methly-pentene, 1-hexene, 1-octene and higher olefins as well as copolymers and terpolymers of the foregoing. In addition, copolymers of ethylene and other olefins including butane, 4-methyl-pentene, hexane, heptene, octane, decene, etc., would also be examples of predominately linear polyolefin polymers.

In addition to the polyolefin polymer, the film layer 30 also includes a filler. As used herein, a "filler" is meant to include particulates and other forms of materials which can be added to the film polymer extrusion blend and which will not chemically interfere with the extruded film but which are able to be uniformly dispersed throughout the film. Generally, the fillers will be in particulate form and may have a spherical or non-spherical shape with average particle sizes in the range of about 0.1 to about 7 microns. Both organic and inorganic fillers are contemplated to be within the scoped of the present invention provided that they do not interfere with the film formation process, or the ability of the film layer to function in accordance with the teachings of the present invention. Examples of suitable fillers include calcium carbonate ($CaCO_3$), various kinds of clay, silica ($SiO_2$), alumina, barium carbonate, sodium carbonate, magnesium carbonate, talc, barium sulfate, magnesium sulfate, aluminum sulfate, titanium dioxide ($TiO_2$), zeolites, cellulose-type powders, kaolin, mica, carbon, calcium oxide, magnesium oxide, aluminum hydroxide, pulp powder, wood powder, cellulose derivatives, chitin and chitin derivatives. A suitable coating, such as, for example, stearic acid, may also be applied to the filler particles, as desired.

The film layer 30 may be formed using any one of the conventional processes known to those familiar with film formation. The polyolefin polymer and filler are mixed in appropriate proportions given the ranges outlined herein and then heated and extruded into a film. In order to provide uniform breathability as reflected by the water vapor transmission rate of the film, the filler should be uniformly dispersed throughout the polymer blend and, consequently, throughout the film layer itself. For purposes of the present invention, a film is considered "breathable" if it has a water vapor transmission rate of at least about 200 grams per square meter per 24 hours ($g/m^2$/24 hrs), at least about 250 $g/m^2$/24 hrs, or at least about 300 $g/m^2$/24 hrs. Generally, once the film is formed, it will have a weight per unit area of less than about 80 grams per square meter (gsm) and after stretching and thinning; its weight per unit area will be from about 12 grams per square meter to about 30 grams per square meter.

Optional Meltblown Nonwoven Web

Figure 2A:
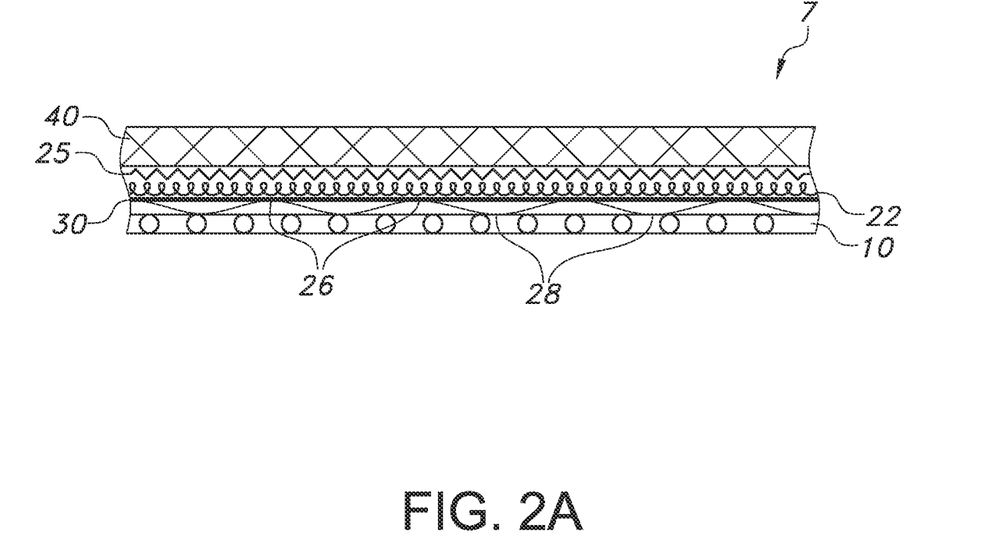
FIG. 2A is a cross-sectional view of a second embodiment including meltblown of a general flooring system of the present invention.
Figure 2B:
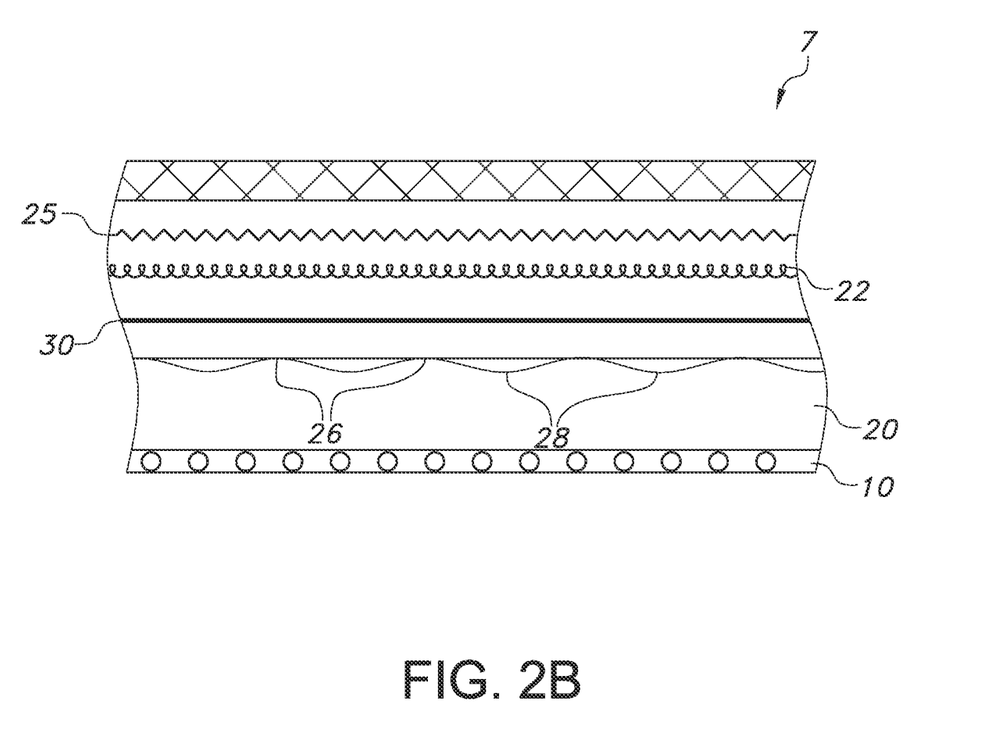
FIG. 2B is an explosive view of a second embodiment including meltblown of a general flooring system of the present invention.

Meltblown nonwoven webs ("MB") are known in the art and have been used in a wide variety of applications. The use of a meltblown nonwoven web layer could be used in a two-layer floor underlayment (not shown) wherein one layer is a PUB spunbond layer and the other is the meltblown nonwoven web layer. In such an embodiment, the floor underlayment may be positioned such that the one side of the meltblown nonwoven layer is directly below and in contact with the underside surface of a finished floor and the other side of the meltblown nonwoven layer is in contact with either the 3D surface or the flat surface of a PUB spunbond layer. The opposite may also be true wherein the MB is in direct contact with the subfloor and the flat surface or the 3D surface of PUB spunbond layer is in direct contact with the underside of a finished floor. Another embodiment (not shown) may be a multilayer floor underlayment wherein a meltblown nonwoven web may be added as an additional layer such that one side of the meltblown nonwoven web is positioned adjacent to either one side of a microporous film wherein the other side of the microporous film is adhered to the flat surface of the PUB spunbond material or the meltblown nonwoven web is positioned adjacent to the 3D surface of the PUB spunbond material wherein a film is adhered to the opposing flat surface of said PUB spunbond material. In such an embodiment, the meltblown nonwoven layer may be in direct contact with the underside of a finished floor or atop a subfloor. For simplicity, the layers may therefore be, (as positioned between the underside of a finished floor and a subfloor): MB-Film-PUB, MB-PUB-Film, Film-PUB-MB or PUB-Film-MB. As specifically shown in FIGS. 2A and 2B, the underside of a finished floor is in direct contact with another embodiment of the present invention wherein an additional layer of spunbond material 25 may be added adjacent to the meltblown web layer 22 wherein one side of the spunbond material 25 may be adjacent to and in contact with one side of a meltblown nonwoven layer 22 wherein the other side of the meltblown nonwoven layer 22 is adjacent to and in contact with a film layer 30 wherein the opposing side of the film layer 30 is adhered to the flat surface of a PUB spunbond layer 20. For simplicity, the layers may therefore be, (as positioned between the underside of a finished floor and a subfloor): SB-MB-Film-PUB. In such an embodiment, as shown, the spunbond material 25 of the floor underlayment may be in direct contact with the underside of a finished floor 40 and the 3D surface of said PUB spunbond layer 20 of the floor underlayment is atop and in contact with a subfloor. The layers may be arranged in a number of ways such that the floor underlayment comprising multiple layers may have any one of the materials of spunbond, meltblown, film or PUB spunbond layered such that either surface of the layers may be in direct contact with the underside of a finished floor or in direct contact atop a subfloor. Regardless of where the addition of a meltblown nonwoven layer is positioned within the floor underlayment of the present invention, the addition of a layer comprising a meltblown nonwoven web 22 contributes to a relatively low permeability within the padding ultimately increasing the absorption and/or reflection of sound waves that are directed into the floor underlayment. Permeability can be measured using the Frazier method. The Frazier permeability of the floor underlayment should be less than about 75 cubic feet per minute per square foot ($cfm/ft^2$) (about 22.9 cubic meters per minute per square meter ($m^3/min/m^2$). Ideally, the Frazier permeability should be less than about 50 $cfm/ft^2$ and preferably less than about 30 $cfm/ft^2$. The Frazier permeability test can be done with a Frazier Air Permeability tester available from Frazier Precision Instrument Company and measure in accordance with Federal Test Method 5450, Standard No. 191A (ASTM D737-96). In general, meltblown fibers contained in meltblown webs have an average fiber diameter of up to about 10 microns with very few, if any, of the fibers exceeding 10 microns in diameter. It is preferred, however, that the meltblown fibers of the present invention have an average fiber diameter of less than about 7 microns. Preferably, the meltblown fibers have an average fiber diameter less than about 5 microns and more preferably between about 1.0 micron to about 4.0 microns and most preferably between about 2.0 microns to about 3.0 microns. If the average meltblown fiber diameter is greater than about 7 microns, the permeability of the floor underlayment tends to be increased which corresponds to a lower absorption of the sound. Thus, again, it is desirable that the average fiber diameter is less than about 7 microns. Despite the low thickness and high density, the addition of a meltblown web layer 22 can provide enhanced benefits to the present invention by increasing the way in which the floor underlayment is able to absorb sound.

Meltblown fibers are formed by extruding molten thermoplastic material through a plurality of fine, usually circular, die capillaries as molten threads or filaments into opposing flows of high velocity, usually heated gas streams, such as air, which attenuate the filaments of molten thermoplastic material to reduce their diameters and break the streams into discontinuous fibers of small diameter. Thereafter, the meltblown fibers are deposited onto a collecting surface to form a web of randomly dispersed meltblown fibers. The meltblown web possesses integrity due to entanglement of individual fibers in the web as well as some degree of thermal or self-bonding between the fibers, particularly when collection is effected only a short distance after extrusion. The meltblown fibers used in the floor underlayment can be made by any process known in the art. An exemplary process is disclosed in U.S. Pat. No. 3,849, 241 to Butin et al., where air-borne fibers, which are not fully quenched, are carried by a high velocity gas stream and deposited on a collecting surface to form a web of randomly dispersed and autogenously bonded meltblown fibers. As is known in the art, the flow rate, temperature and pressure of the high velocity gas stream can be adjusted to form continuous meltblown fibers or discontinuous fibers. In addition, the flow rate, temperature and pressure of the high velocity gas stream can be adjusted to change the average fiber diameter and other properties of the fibers. The meltblown nonwoven web may be formed using a single meltblown die or a series of meltblown dies. When a meltblown web layer 22 is added, it is preferred that the meltblown web has a thickness of from about 0.2 mm to about 3 mm or to about 5 mm. The amount of meltblown added can range from about 70 gsm, from about 170 gsm, from about 340 gsm, from about 510 gsm, or from about 680 gsm.

As is known in the art, the characteristics of the meltblown fibers can be adjusted by manipulation of the various process parameters used for each extruder and die head in carrying out the meltblowing process. An additional advantage of using meltblown fibers in the floor underlayment of the present invention is that the meltblown layer 22 also acts as a moisture barrier, preventing moisture from passing through the floor underlayment. Even though the floor underlayment has these moisture barrier properties, the floor underlayment still allows for air to pass through the structure.

The floor underlayment of the present invention provides a significant improvement in noise dampening without the use of a poured underlayment system and without compromising the integral properties such as breathable barriers and water vapor permeability. Each of these attributes contributes to the overall advantage of the present floor underlayment. With the use of an Impact Sound Transmission test, the overall invention shows in the ensuing examples that the Sound Pressure Level Reduction as measured in dB at 800 Hz and 1600 Hz is substantially lower than current floor underlayments available in the market. In other words, the present floor underlayment is able to absorb much more sound and transmit less noise. Conjointly, the floor underlayment and the finished floor may exhibit a noise reduction of from about 50 dB, from about 65 dB, up to about 75 dB or up to about 85 db in Delta IIC testing. Using a small scale 6-inch concrete slab floor-ceiling assembly with a 120 db noise application overlaid with various underlayments, the results demonstrate that the acoustic absorption of the present invention makes for an enhanced material that can increase the quality and value in a home or building. More importantly, it does so while also providing a breathable barrier and air flow channels. Thus, the present invention offers the optimal combination that fails to exist in prior applications. The present invention provides a noise transmission level of less than about 60 dB, less than about 50 dB, less than about 40 dB and preferably, less than about 35 dB or less than about 30 db. The embodiment of the invention comprising the additional meltblown layer is able to reflect noise transmission levels up to at least about 10 dB less or up to at least about 20 dB less than the PUB and film material alone. The floor underlayment of the present invention is able to significantly reduce the amount of noise that is transmitted between the floors which provides an overall quality to the end user and an increased marketing value to the manufacturer.

EXAMPLES

The following examples further describe and demonstrate embodiments within the scope of the present invention. The examples are given solely for the purpose of illustration and are not to be construed as limitations of the present invention, as many variations thereof are possible without departing from the spirit and scope of the invention.

The following test method was used to measure the Impact Sound Transmission characteristics of various Floor-Ceiling floor underlayment systems based on the ASTM E 492-09 test procedures.

For each Impact Sound Pressure measurement, a microphone was mounted inside a 1219.2 mm by 1219.2 mm by 914.4 mm high (4 foot by 4 foot by 3 foot high) concrete block chamber that was lined with 101.6 mm (4 inch thick), 0.75 PCF fiberglass insulation. A 6" thick concrete slab acted as the cap for this chamber. With the Standard Tapping machine being operated on the sample/concrete slab combination, the Sound Pressure levels being transmitted through each test sample were measured using a common microphone location which was approximately 685.8 mm (27 inches) from the bottom of the concrete slab. The Sound Pressure levels were measured at ⅓ Octave test frequencies from 100 Hz through 5000 Hz.

Equipment used:
NORSONIC® Model 840-2 Real Time Analyzer (S/N 118720)
NORSONIC® Model 1233 Microphone (S/N 8604)
B&K® Model 2669 Preamplifier (S/N 2221379)
NORSONIC® Model 1251 Sound Calibrator (S/N 17279)
BRUEL & KJAER® Type 3204 Standard Tapping Machine (S/N 84689)

Each of the test assemblies consisted of flooring and floor underlayment combinations each of which will be described in detail within the examples.

Each sample was installed over a 4'×4'×6" thick concrete slab which was supported at each corner by vibration dampening I-Beams. The center hammer of the Standard Tapping Machine was positioned over the dimensional center point of each of the test assemblies. The weights and measurements of the test samples are averaged.

Sample materials that were tested accordingly include the following:

Example 1

Engineered oak 5 ply flooring, floating 170 gsm meltblown, floating over, PUB SFL on 152.4 mm (6 in.) concrete slab. Sample was observed to be approximately 165.63 mm (6.521 in) overall thickness. Weight: 293 g/m2.

Example 2

¾" Prefinished oak flooring, floating over 170 gsm meltblown, floating over, PUB SFL on 152.4 mm (6 in.) concrete slab. Sample was observed to be approximately 175.46 mm (6.908 in.) overall thickness. Weight: 293 g/m2.

Example 3

¾" Prefinished oak flooring, floating over 340 gsm meltblown, floating over, PUB SFL on 152.4 mm (6 in.) concrete slab. Sample was observed to be approximately 178.38 mm (7.02 in.) overall thickness. Weight: 462 g/m².

Example 4

Engineered oak 5 ply flooring, floating over 340 gsm meltblown, floating over, PUB SFL on 152.4 mm (6 in.) concrete slab. Sample was observed to be approximately 168.40 mm (6.693 in) overall thickness. Weight: 462 g/m².

Example 5

Engineered oak 5 ply flooring, floating over PUB SFL on 152.4 mm (6 in.) concrete slab. Sample was observed to be approximately 163.47 mm (6.436 in) overall thickness. Weight: 111 g/m².

Example 6

¾" Prefinished oak flooring, floating over PUB SFL on 152.4 mm (6 in.) concrete slab. Sample was observed to be approximately 173.30 mm (6.82 in.) overall thickness. Weight: 111 g/m².

Example 7

Engineered oak 5 ply flooring, floating over 510 gsm meltblown, floating over, PUB SFL on 152.4 mm (6 in.) concrete slab. Sample was observed to be approximately 170.71 mm (6.72 in) overall thickness. Weight: 631 g/m².

Example 8

¾" Prefinished oak flooring, floating over 510 gsm meltblown, floating over, PUB SFL on 152.4 mm (6 in.) concrete slab. Sample was observed to be approximately 180.54 mm (7.10 in.) overall thickness. Weight: 631 g/m².

COMPARATIVE EXAMPLES

Comparative #1

Engineered oak 5 ply flooring, floating-over, SHENZHEN® 1.8 mm foam on 152.4 mm (6 in.) concrete slab. Sample was observed to be approximately 165.50 mm (6.516 in) overall thickness. Weight: 215 g/m².

Comparative #2

¾" Prefinished oak flooring, floating over SHENZHEN® 3.0 mm foam on 152.4 mm (6 in.) concrete slab. Sample was observed to be approximately 177.03 mm (6.97 in.) overall thickness. Weight: 358 g/m².

Comparative #3

¾" Prefinished oak flooring, floating over BLACK JACK® foam on 152.4 mm (6 in.) concrete slab. Sample was observed to be approximately 174.75 mm (6.88 in.) overall thickness. Weight: 78 g/m².

Comparative #4

Engineered oak 5 ply flooring, floating-over, ROBERTS AIR GUARD® on 152.4 mm (6 in.) concrete slab. Sample was observed to be approximately 164.84 mm (6.49 in) overall thickness. Weight: 146 g/m².

Comparative #5

¾" Prefinished oak flooring, floating over ECO-ULTRA QUIET® on 152.4 mm (6 in.) concrete slab. Sample was observed to be approximately 173.73 mm (6.84 in.) overall thickness. Weight: 626 g/m².

Comparative #6

Engineered oak 5 ply flooring, floating-over, FLOOR MUFFLER® on 152.4 mm (6 in.) concrete slab. Sample was observed to be approximately 164.28 mm (6.46 in) overall thickness. Weight: 85 g/m².

Comparative #7

¾" Prefinished oak flooring, floating over QUIET WALK® 3.0 on 152.4 mm (6 in.) concrete slab. Sample was observed to be approximately 175.90 mm (6.92 in.) overall thickness. Weight: 579 g/m².

Comparative #8

Engineered oak 5 ply flooring, floating-over, ECO-ULTRA QUIET® on 152.4 mm (6 in.) concrete slab. Sample was observed to be approximately 164.10 mm (6.516 in) overall thickness. Weight: 626 g/m².

The results of the testing are shown as follows:

| | Sample Number (Flooring: Engineered Oak 5 Ply) | Value SPL in dB 800 Hz |
|---|---|---|
| Ex 7 | Example 7 | 37.1 |
| Ex 4 | Example 4 | 40.2 |
| Ex 1 | Example 1 | 41.6 |
| CP 4 | Comparative 4 | 44.9 |
| CP 1 | Comparative 1 | 49.2 |
| CP 6 | Comparative 5 | 50.4 |
| Ex 5 | Example 5 | 53.8 |
| CP 8 | Comparative 8 | 56.6 |
| | Sample Number (Flooring: ¾" Prefinished Oak) | |
| Ex 8 | Example 8 | 46.3 |
| Ex 3 | Example 3 | 48.9 |
| Ex 2 | Example 2 | 53.9 |
| CP 7 | Comparative 7 | 54.2 |
| CP 3 | Comparative 3 | 57.4 |
| CP 2 | Comparative 2 | 58.2 |
| CP 5 | Comparative 5 | 59.8 |
| Ex 6 | Example 6 | 62.3 |

| | Sample Number (Flooring: Engineered Oak 5 Ply) | Value SPL in dB 1600 Hz |
|---|---|---|
| Ex 7 | Example 7 | 32.2 |
| Ex 4 | Example 4 | 33 |
| Ex 1 | Example 1 | 37.2 |
| CP 4 | Comparative 1 | 39.1 |
| CP 6 | Comparative 6 | 43.1 |
| CP 1 | Comparative 1 | 43.1 |

-continued

| Ex 5 | Example 5 | 49.2 |
| CP 8 | Comparative 8 | 49.5 |

Sample Number (Flooring: ¾" Prefinished Oak)

| Ex 8 | Example 8 | 39.9 |
| Ex 3 | Example 3 | 41 |
| Ex 2 | Example 2 | 42.1 |
| CP 7 | Comparative 7 | 42.7 |
| CP 2 | Comparative 2 | 48.9 |
| CP 3 | Comparative 3 | 50.1 |
| CP 5 | Comparative 5 | 57.7 |
| Ex 6 | Example 6 | 59 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A floor underlayment comprising at least two layers, said first layer comprising a pattern-unbonded nonwoven web, said pattern-unbonded nonwoven web having a first surface opposite a second surface, said first surface being flat and said second surface comprising a 3D surface, said 3D surface having thereof a pattern of from about 15 percent to about 60 percent of continuous bonded areas defining a plurality of discrete unbonded areas; and a second layer comprising a microporous film having a first surface opposite a second surface, said first surface of said film adhered to said first flat surface of said pattern-unbonded nonwoven web; wherein said floor underlayment is positioned directly in contact with the underside surface of a finished floor; and wherein the sound pressure level (SPL in dB at 800 Hz or 1600 Hz) reduction IIC of said finished floor and said floor underlayment conjointly exhibit a value of about 30 to about 40, wherein the continuous bonded areas are substantially fluid impermeable and the plurality of discrete unbonded areas are fluid permeable.

2. The floor underlayment of claim 1 wherein the underlayment is positioned atop a subfloor.

3. The floor underlayment of claim 2 wherein said second 3D surface of said pattern-unbonded nonwoven web is directly in contact with said subfloor.

4. The floor underlayment of claim 1 wherein the floor underlayment and finished floor conjointly exhibit a noise reduction of from about 50 dB to about 65 db in Delta IIC testing.

5. The floor underlayment of claim 1 wherein said pattern-unbonded nonwoven web comprises a spunbond web having a basis weight of from about 30 gsm to about 400 gsm.

6. The floor underlayment of claim 1 wherein said pattern-unbonded nonwoven web comprises fibers formed from a thermoplastic polymeric material, said thermoplastic material having been selected from the group consisting of poly(vinyl chloride)s, polyesters, polyamides, polyfluorocarbons, polyolefins, polyurethanes, polystyrenes, poly(vinyl alcohol)s, caprolactams, and copolymers thereof.

7. The floor underlayment of claim 1 wherein said microporous film has a water vapor transmission rate of at least about 200 grams per square meter per 24 hours to about 300 grams per square meter per 24 hours.

8. The floor underlayment of claim 7 wherein said microporous film has a weight per unit area after stretching and thinning from about 12 grams per square meter to about 30 grams per square meter.

9. The floor underlayment of claim 1 wherein the total basis weight of the floor underlayment is from about 80 gsm to about 850 gsm.

10. A floor underlayment comprising multiple layers, said first layer comprising a pattern-unbonded nonwoven web, said pattern-unbonded nonwoven web having a first surface opposite a second surface, said first surface being flat and said second surface comprising a 3D surface, said 3D surface having thereof a pattern of from about 15 percent to about 60 percent of continuous bonded areas defining a plurality of discrete unbonded areas; a second layer comprising a microporous film having a first surface opposite a second surface, said first surface of said film adhered to said first flat surface of said pattern-unbonded nonwoven web; and a third layer comprising a meltblown nonwoven layer having a first surface and an opposing second surface; wherein said floor underlayment is positioned directly in contact with the underside surface of a finished floor; and wherein the sound pressure level (SPL in dB at 800 Hz or 1600 Hz) reduction IIC of said finished floor and said floor underlayment conjointly exhibit a value of about 30 to about 40.

11. The floor underlayment of claim 10 wherein the underlayment is positioned atop a subfloor.

12. The floor underlayment of claim 11 wherein said second 3D surface of said pattern-unbonded nonwoven web is atop and directly in contact with said subfloor.

13. The floor underlayment of claim 10 comprising a fourth layer of spunbond wherein said spunbond has a first surface and an opposing second surface.

14. The floor underlayment of claim 13 wherein the layers are positioned such that the first surface of said spunbond layer is positioned to be available for direct contact with a first external surface, said first external surface selected from a finished floor and a subfloor, and said second opposing surface of said spunbond layer is adjacent to and in contact with said first surface of said meltblown layer, said second opposing surface of said meltblown layer is in adjacent to and in contact with said first surface of said film layer, said second opposing surface of said film layer is adhered to said first flat surface of said PUB spunbond layer, and said second opposing surface of said PUB spunbond layer is positioned to be available for direct contact with a second external surface, said second external surface selected from a finished floor and a subfloor.

15. The floor underlayment of claim 14 wherein the floor underlayment and finished floor conjointly exhibit a noise reduction of from about 50 dB to about 85 dB in Delta IIC testing.

16. The floor underlayment of claim 14 wherein said first external surface is a finished floor and said second external surface is a subfloor.

17. The floor underlayment of claim 10 wherein said microporous film has a water vapor transmission rate of at least about 200 grams per square meter per 24 hours to about 300 grams per square meter per 24 hours.

18. The floor underlayment of claim 10 wherein the meltblown nonwoven web comprises meltblown fibers with an average fiber diameter of less than about 7 microns.

19. The floor underlayment of claim 10 wherein the meltblown nonwoven web has a thickness of from about 0.2 mm to about 5 mm.

20. The floor underlayment of claim 10 wherein the total basis weight of the floor underlayment is from about 80 gsm to about 850 gsm.

21. The floor underlayment of claim 10 wherein the continuous bonded areas are substantially fluid impermeable and the plurality of discrete unbonded areas are fluid permeable.

22. A floor underlayment comprising at least two layers, said first layer comprising a pattern-unbonded nonwoven web, said pattern-unbonded nonwoven web having a first surface opposite a second surface, said first surface being flat and said second surface comprising a 3D surface, said 3D surface having thereof a pattern of from about 15 percent to about 60 percent of continuous bonded areas defining a plurality of discrete unbonded areas; and a second layer comprising a microporous film having a first surface opposite a second surface, said first surface of said film adhered to said first flat surface of said pattern-unbonded nonwoven web; wherein said floor underlayment is positioned directly in contact with the underside surface of a finished floor; and wherein the sound pressure level (SPL in dB at 800 Hz or 1600 Hz) reduction IIC of said finished floor and said floor underlayment conjointly exhibit a value of about 33 to about 37.

* * * * *